United States Patent Office 3,291,213
Patented Dec. 13, 1966

3,291,213
METHOD FOR TREATING A PERMEABLE MASS
Cornelis Bezemer, Franciscus H. Meijs, and Marinus van Zanten, all of Rijswijk, Netherlands, assignors to Shell Oil Company, New York, N.Y., a corporation of Delaware
Filed Apr. 20, 1964, Ser. No. 361,013
Claims priority, application Great Britain, Apr. 22, 1963, 15,776/63
7 Claims. (Cl. 166—33)

This invention relates to a method for treating a permeable earth mass. According to this invention, use is made of an epoxy compound which on hardening either fills the pore space of the permeable mass or forms a film covering the walls of the pore space of said mass. The earth mass treated according to this invention may be originally consolidated, partly consolidated or unconsolidated. It may be above ground or underground.

The method according to the invention wherein the hardened epoxy compound fills the pore space of a permeable mass may be applied for plugging purposes in case the mass is to be tight against the passage of fluids, which is often required in dams or dikes, in holes dug in the ground, or to close the communication between a subsurface formation containing oil, water or gas and the interior of a well or mine-shaft penetrating such formation. It may be employed for foundation purposes, wherein the strength of a mass has to be improved, for example, to strengthen the subsurface soil below buildings, or at the lower ends of piles.

In the method according to the invention wherein the hardened epoxy compound forms a film covering the walls of the pore space of a permeable mass, the original permeability of a mass is substantially retained; this method is, therefore, particularly suitable to provide a bond between the loose grains of a subsurface formation which is penetrated by a well, to prevent the grains from being entrained by fluid passing into or out of the formation. In particular when such a well is used as a production well for producing gas, water or oil from a subsurface formation, considerable damage can be done to the production equipment by those grains which are carried by the fluid flow to the well head, while the coarser grains, which accumulate in the producting section of the well, can reduce the well's production rate to such an extent that it is not possible to produce the well economically. Consolidation according to this invention can completely prevent such sand damage.

This invention will be illustrated by reference to the attached drawing, wherein.

Figure 1:
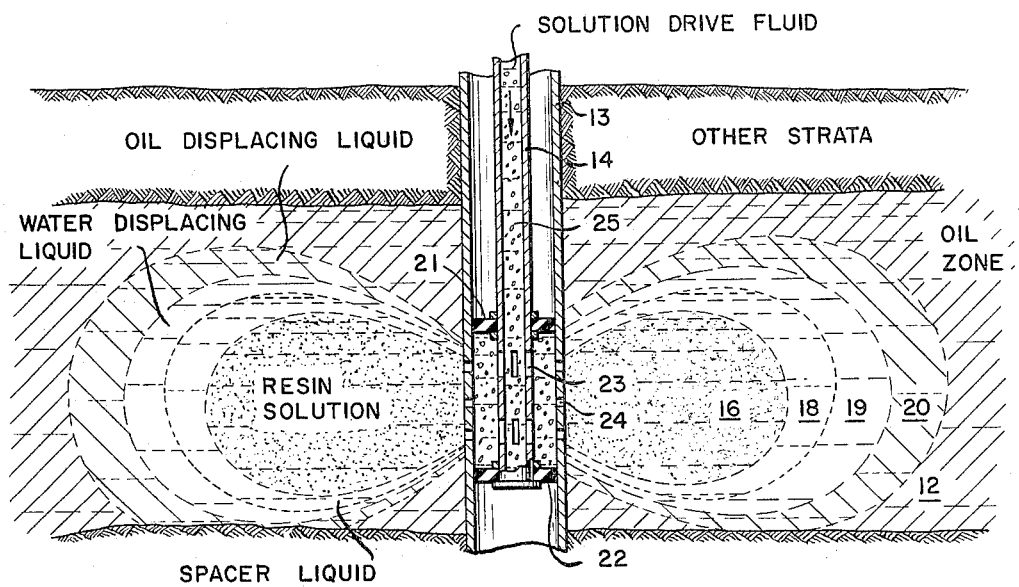
FIG. 1 is a vertical section through a well borehole, diagrammatically illustrating the injection of a resin solution into a formation for sand consolidation with retentention of permeability.

This invention is especially useful in the consolidation of unconsolidated sand formations surrounding the boreholes of oil wells. The remainder of the description therefore will be largely directed to such sand consolidation.

One of the requirements of a good consolidation method is that it can be applied at the various temperatures which are to be expected in the formations. Further, it is required that the bond formed by the hardened resin between the particles or grains of the formation will be resistant to formation fluids and/or to chemicals injected into the formation, as well as to movements in the neighboring unconsolidated parts of the formation. On the other hand, the amount of resin required to give the formation the necessary mechanical strength should not excessively impair the permeability thereof, so that a flow of fluids from the formation to the well, or vice versa, will remain possible. This is of utmost importance when consolidating formations having a low permeability. This invention meets the stated requirement for a good sand consolidation method.

Various resins have been employed in attempts to provide satisfactory consolidation of sand-producing formations. This invention provides an improvement of a recently developed and commercialized method which comprises the steps of:

(a) Preparing a solution of an epoxy compound and one of certain curing agents in a hydrocarbon solvent;

(b) Injecting the solution into the pore space of a suitably prepared earth mass or formation; and (c) Retaining the solution in the mass for a sufficient time to permit an intermediate resinous product to separate from the solution, deposit on the particles of the mass and cure to a hard, cross-linked resin, or for the whole solution to gel and fill the pore space.

One of the advantages of said method and of this invention over the use of phenolic resins and over some previously described methods of utilizing epoxy resins for the consolidation of earth formations is that all reactants required to produce the resinous cement are present in a single batch of liquid. As will be described hereinafter, it is desirable to pretreat the formation to be consolidated with a water-displacing liquid, if desired preceded by an oil-displacing liquid and followed by a spacer liquid. These do not exert any significant chemical action on the earth formation, serving merely to remove any unbound water from the formation. A spacer liquid may not be needed, for example, when the water-displacing liquid is compatible with the resin solution.

A particularly desirable aspect of said method and of this invention is that the amine not only serves as curing agent but also has the property of imparting surfactant characteristics to the partially cured resin which precipitates from solution, causing said resin to preferentially adhere to grains of the formation. The amine is preferably employed in at least 5% molar excess over the amount stoichiometrically required to react with all the epoxy groups of the uncured epoxy resin. By preparing the resin amine solution in this manner the bond between precipitated resin and the sand grains of originally water-wet earth formation is greatly improved.

If precipitated resin were present in the solution when it reaches the formation it would tend to cause the undesired effects described above. It is, therefore, an important aspect of said method and of this invention that the solution is prepared in a controlled manner to prevent any precipitation of solid resin prior to the time the solution is completely injected into the formation to be treated. This is accomplished by selecting the type and/or concentration of the components of the resin-forming solution in a manner described hereinafter in greater detail, and by preventing contact of the solution, prior to injection into the formation, with materials which would precipitate resin therefrom.

A significant distinctive characteristic of said method and of this invention as applied to sand consolidation is that properly composed treating solutions can retain partial reaction product of polyepoxide and amine in solution until the treating composition is placed in the formation, and thereafter permit partially cured product to separate as a viscous, insoluble liquid phase which preferentially wets sand grains. Solutions of other resin at such a stage of partial curing tend to form gels which do not selectively wet the grains of the formation and hence are not able to result in a treated formation which still retains the major proportion of its original permeability to oil. Also, formations treated according to this invention, in which resin cementing takes place at the contact points of the individual grains of the formation, are stronger than similar formations treated by other methods.

The period elapsing between the moment of preparation of the solution and the moment at which the first droplets of resin separate from this solution or the first evidence of gelling is observed is called the "Initial Resin Separation" time; this will be referred to hereinafter as IRS time.

So as to prevent plugging of the area over which the solution enters the mass, the solution has to be injected into the mass before gelling or separation of resin droplets therefrom. It will be clear that the IRS time has to be longer than the time required to pump the solution from the spot where the solution has been prepared into the mass which is to be treated.

As the IRS time is shortened by an increase of the temperature under which the reaction between the epoxy compound and the curing agent takes place, difficulties when treating high-temperature masses (such as formations lying at great depths) are often encountered, specifically when long injection periods are required, e.g., when treating masses having low injectivity. Then even a small, unexpected delay in the pumping operation when transporting the solution down the hole to the formation to be treated will result in a separation of resin from the solution or gelling of the solution before the solution has entered the formation. The resin then plugs the pores of the area over which the solution should enter the formation. Consequently the pressure required to inject the solution into the formation rises above the working pressure of the injection pumps, which stall, leaving the solution in the well, where the resin hardens in situ. A new attempt to treat the formation can be undertaken only after removal of the hardened resin plug deposited on the wall of the well and in the well bore.

This invention now provides a method for utilizing in the above-outlined earth-treating method a curing agent which results in unusually long IRS times and consequently allows the treatment of formations which are at a greater depth or have a higher formation temperature or a lower injectivity than formations which could be treated by previously available methods.

The method for treating a permeable mass according to this invention comprises the steps of:

(a) Preparing a solution of a resin-forming epoxide having more than one vicinal epoxy group per molecule, and bis(4-aminophenyl)methane as curing agent for said epoxide, in a mixture of highly aromatic hydrocarbon and lower aliphatic ketone, the solvent being characterized by preferential solubility for the intermediate resin product so as to keep dissolved the amount of intermediate resin product formed during the time required to pump said solution into an earth formation to be treated;

(b) Injecting the solution into the pore space of a suitably prepared permeable earth mass or formation; and (c) Retaining the solution in the mass for a sufficient time to permit an intermediate resinous product to form, separate as a liquid, and deposit on the particles of the mass or for the whole solution to gel and fill the pore space, and for the intermediate resin to cure to a hard, cross-linked resin.

The porosity and permeability of the formation to be treated permit estimation of the amount of surface area that should be contacted by the cured resin. The concentration of the resin components (epoxy compound and curing agent) is selected to form a solution containing at least 3 and preferably between 5 and 50 percent by volume of resin components, at least sufficient to contact substantially all of the surface area in the portion of formation to be impregnated by the solution. The range below about 20 percent by volume is generally employed when the permeability of the formation is to be retained in substantial part, and the range above about 20 percent when plugging is desired. The solution is preferably adjusted to retain a viscosity below 100 centipoises at formation conditions.

COMPONENTS USED IN THE TREATING PROCESS

*Solvents*

The solvents in which the polyepoxide and curing agent are dissolved to prepare the resin solutions used in this invention are mixtures of predominantly aromatic hydrocarbons with lower aliphatic ketones.

The hydrocarbon component of the solvent may be a single aromatic hydrocarbon or a mixture of at least about 80% by weight aromatic hydrocarbon with saturated non-aromatic hydrocarbons. Suitable aromatic hydrocarbons are benzene or benzene derivatives, e.g., alkyl benzenes such as toluene, xylenes and the like. Other suitable aromatic hydrocarbons are those obtained by extraction of aromatics from kerosene, gas oil, spindle oil, lubricating oil or heavy catalytically cracked cycle oil. A particularly useful aromatic composition is a kerosene extract boiling in the range from 350° to 510° F., e.g., an SO₂ kerosene-extract of A.P.I. gravity 25–28°, an initial boiling point between 350° and 390° F., an end point between 450° and 510° F., and an aromatics content of at least 80% by weight, the remainder being saturated non-aromatic hydrocarbons.

The ratio of aromatic to non-aromatic hydrocarbons is one of the major determinants of the state in which resin-separation takes place. The other major determinant is the total concentration of resin-forming ingredients. Solutions in which the aromatics content of the hydrocarbon solvent is over 90% by weight tend to gel, rather than permitting the resin to separate out as a separate phase, when the concentration of resin-forming ingredients is between 20 and 50 percent by volume of the solution.

A lower aliphatic ketone is employed in an amount sufficient to cause the amine to remain in solution in the hydrocarbon solvent. The ketone is preferably acetone, but other ketones of from 4 to 7 carbon atoms per molecule may be employed, e.g., methyl ethyl ketone, methyl propyl ketone, diisopropyl ketone or methyl isobutyl ketone. The ketone is generally employed in a concentration in the range from 2 to 20 volume percent of the solution. Use of about ten percent of acetone is generally suitable.

*Polyepoxides*

The polyepoxides used in the process of the invention comprise those organic materials possessing more than one vic-epoxy group, i.e., more than one

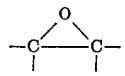

group. These materials may be saturated or unsaturated, aliphatic, cycloaliphatic, aromatic or heterocyclic. They are referred to herein as resin-forming epoxides or as polyepoxides. In the art, even the uncured materials are often referred to as epoxy resins.

Polyepoxides can be described in terms of epoxy equivalent value, which refers to the number of epoxy groups contained in the average molecule. The meaning of this expression is described in U.S. 2,633,458. If the polyepoxide consists of a single compound and all of the epoxy groups are intact, the epoxy equivalency will be an integer, such as 2, 3, 4 and the like. However, in the case of polymeric polyepoxides many of the materials may contain some of the monomeric monoepoxides or have some of their epoxy groups hydrated or otherwise reacted and/or contain macromolecules of somewhat different molecular weight so that epoxy equivalent values, though greater than 1.0, may be quite low and may be fractional. The polymeric material may, for example, have epoxy equivalent values such as 1.4, 1.8, 2.5 and the like.

Polyepoxides suitable for conversion to cured epoxy resins are well-known materials of commerce. Many are described in the book "Epoxy Resins" by Lee and Neville, McGraw-Hill, New York, 1957.

Examples of such polyepoxides are the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, and polynuclear phenols such as 2,2-bis(4-hydroxyphenyl)propane (Bisphenol A), 2,2-bis(4-hydroxyphenyl)butane, 4,4'-dihydroxybenzophenone, bis(4-hydroxyphenyl)ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

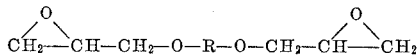

wherein R represents a divalent hydrocarbon radical of the dihydric phenol. The polymeric products will generally not be a single simple molecule but will be a complex mixture of glycidyl polyethers of the general formula

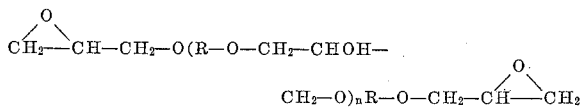

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number as noted above.

The aforedescribed preferred glycidyl polyethers of the dihydric phenols are prepared in known manner by reacting the required proportions of the dihydric phenol and the epichlorohydrin in an alkaline medium.

Preferred members of the above-described group of polyepoxides are the glycidyl polyethers of the dihydric phenols, and especially of 2,2-bis(4-hydroxyphenyl)propane, having an epoxy equivalency between 1.0 and 2.1, preferably at least 1.4, a molecular weight between 250 and 900, and a Durran's Mercury Method softening point preferably no greater than 30° C. Most preferred are the normally liquid products having a molecular weight of about 350 to 400 and an epoxy equivalent of about 1.75 to 2.1, and typically about 1.85, which may be prepared as described under the heading "Polyether A" in U.S. 2,633,458.

The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

Another group of polyepoxides that may be used comprises the glycidyl ethers of novolak resins, which resins are obtained by condensing an aldehyde with a polyhydric phenol. Typical members of this class are the epoxy resins from formaldehyde 2,2-bis(4-hydroxyphenyl)propane novolak resin.

Curing agent

The curing agent employed according to this invention is bis(4aminophenyl)methane. This material is not substantially soluble in hydrocarbons. However, it has been found that it can be dissolved in a mixture of aromatic hydrocarbons and lower aliphatic ketones, as described above.

It is preferred to prepare a concentrate of the curing agent in a mixture of ketone and predominantly aromatic hydrocarbon and age this solution for at least one day before using it in preparing a resin solution. The solution of curing agent should be stored in a closed container to avoid reaction of the amine with carbon dioxide which is present in the atmosphere.

Cure rate modifier

Lower aliphatic ketones act as cure-rate retardants. However, use of sufficient ketone to solubilize the amine cannot be avoided in solutions prepared according to this invention. It may, therefore, be necessary to add a cure accelerator or promoter. The use of cure accelerators to promote the curing reaction of amines and polyepoxides is known. An alcohol can be used. Preferred as a cure accelerator is phenol. Other phenolic compounds also are useful accelerators, e.g., dihydric phenols or alkyl-substituted phenols. Proportions may range to 4% by volume, basic solution.

Crude oil displacing fluids

If the formation to be treated is an oil-bearing one, it may be advantageous to first displace crude oil from the formation. This may be done by any hydrocarbon fluid of reasonably low viscosity, e.g., a kerosene, diesel oil, or other middle distillate, which is miscible with the crude oil in the formation.

Water displacing fluids

When consolidating part of an underground formation which contains connate water, i.e., liquid water adhering to the grains of the formation due to capillary forces, it is usually preferred to remove such connate water before injecting resin solution into the formation. Several types of water removing fluids may be employed for flushing connate water from a formation. The water-removing fluid may be an oil solution of a surfactant. A preferred surfactant for this purpose has the formula

wherein R is an alkyl group derived from coconut oil, soya oil or tallow. A different group of suitable water-removing fluids are ketones and alcohols having less than 6 C-atoms per molecule, e.g., acetone, methyl ethyl ketone, methanol, ethanol or isopropanol.

Spacer fluids

A spacer fluid may be employed between the water-displacing fluid and the resin solution. Such a spacer fluid serves, i.a., to prevent untimely precipitation of epoxy resins. Suitable spacer fluid is soluble in the resin solution and non-reactive with the ingredients thereof. Suitable spacer fluids are, in general, the hydrocarbons used as solvents in the polyepoxide solutions, or the hydrocarbon-ketone compositions used as resin solvents. The spacer fluid may have a non-uniform composition. For example, the predominant part, first pumped into the formation, may be a diesel oil, while the final part contains a substantial admixture of an aromatic hydrocarbon.

Drive fluid

In the process of this invention, each of the above-mentioned pre-treating fluids is directly followed by the next one, so that the latter serve as drive fluids for the former. The resin solution directly follows the last pre-treating fluid.

Some care must be exercised in selecting a drive fluid for the resin solution. As the resin solution should be kept in the part of the formation to be consolidated until the reaction is completed, the injection of the drive fluid should be interrupted as soon as all the resin solution has entered the formation. Care should be taken that the solution or part thereof does not remain in the well as otherwise an impermeable epoxy resin sheath will be formed on the formation face, which will prevent the passage of fluid out of the formation into the well or vice versa. It is equally important, however, to make sure that the solution is not driven too far into the formation, as otherwise those parts of the formation directly surrounding the well will not be consolidated. Therefore a fluid having plastering properties (such as a mud slush) is suitably used as drive medium, as such fluid will form a substantially impermeable sheath on the wall of the formation directly after the resin solution has been forced into the formation, whereby any further displacement of the resin solution in the formation will be prevented. An alternative is the use of a gel plug or a mechanical plug between the resin solution and the drive fluid. When such a plug is employed, the drive fluid may be any desired liquid, e.g., crude oil or salt water.

ILLUSTRATIVE EXAMPLES

In the following examples, the epoxy compound is of the type prepared from 2,2-bis(4-hydroxyphenyl)propane and epichlorohydrin as described in U.S. 2,633,458 under the heading "Polyether A"; it has an epoxy value of about 0.54 eq./100 g., an epoxide equivalent of about 185 an average molecular weight of about 380, and a viscosity at 25° C. in the range from 100 to 160 poises. The hydrocarbon solvent is the above-described hydrocarbon mixture boiling between 370° and 510° F. and having a content of aromatic hydrocarbons in excess of 80%. In the final solutions the combined concentration of epoxy compound and curing agent is about 18 percent by volume.

In the tests, a mass of surface sand having a mean particle size of 0.1 millimeter was consolidated at various curing temperatures by a solution of the compositions shown in Table 1.

*Table 1*

Curing agent: Bis(4-aminophenyl)methane, 4.5 vol. percent.
Solubility promoter: Acetone, 10 vol. percent.
Epoxy compound: Defined in text, 13.5 vol. percent.
Hydrocarbon solvent: Defined in text, 68–71.75 vol. percent.
Reaction accelerator: Phenol, 0.25–4 vol. percent.

The weight ratio of curing agent to polyepoxide was 0.33; this ratio, while keeping the combined concentration of curing agent and epoxy compound in the solution constant (in this case 18 vol. percent) had been found to give maximum compressive strength of the mass after consolidation thereof.

In the second column of Table 2 below, the amount of phenol required for obtaining an IRS time of 2½ hours at various temperatures is shown in grams per liter of solution.

In the third column of Table 2, there is shown the compressive strength at curing temperature of the consolidated mass after one day's curing and 3 days' flushing with gas oil at curing temperature.

*Table 2*

| Curing Temperature (° C.) | Phenol Concentration (grams per liter) | Compressive Strength (kg. per cm.$^2$) |
|---|---|---|
| 60 | 40 | 267 |
| 80 | 20 | 271 |
| 100 | 10 | 257 |
| 120 | 2.5 | 161 |

The results as indicated in Table 2 show that use of bis(4-aminophenyl)methane in hydrocarbon-ketone solution extends the range of conditions at which permeable earth masses can be successfully treated with epoxy resin solution to temperatures up to 120° C.; the compressive strength at 120° C. still amounts to a satisfactory value of about 160 kilograms per square centimeter.

For convenience in preparing solutions, about the same results are obtained with solutions containing phenol in a volume percentage corresponding to the above gram per liter concentration, e.g., between 2.0 and 0.75 volume percent for temperatures of 80° C. to 120° C.

The compressive strength can be increased by increasing the concentration of the curing agent and the epoxy compound in the solution while maintaining their ratio constant. This increase in concentration is accompanied by an increasing reduction of permeability. In the above tests, the reduction of permeability lies within the range of 30% to 40%.

Table 3 illustrates the range of IRS times attainable at different temperatures by varying only the phenol concentration in the composition of Table 1.

*Table 3*

| Phenol Concentration, g./l. | 0 | 10 | 20 | 30 | 40 |
|---|---|---|---|---|---|
| IRS Time at 60° C., hrs | | | 5.1 | 3.5 | 2.6 |
| IRS Time at 80° C., hrs | | 4.7 | 2.7 | 1.8 | 1.3 |
| IRS Time at 100° C., hrs | | 2.5 | 1.4 | 1.0 | 0.8 |
| IRS Time at 120° C., hrs | 4.4 | 1.2 | 0.7 | 0.5 | 0.4 |

The long IRS times attainable are advantageous when injection is to be made under difficult conditions, e.g., into a formation of unusually low injectivity.

In making up the solutions for these tests, an at least one day old concentrate solution of the curing agent in acetone and hydrocarbon was employed to make up the epoxide solution. It was found that with a freshly prepared solution, or when the curing agent was directly dissolved in the total epoxide-hydrocarbon-acetone mixture, the IRS times were 12% less than those given in the tables.

A preferred method of practicing the present invention in consolidating an underground formation with retention of permeability will now be described by way of example.

In an oil well in which the oil-producing formation consists of an unconsolidated sand, the formation conditions such as temperature and injectivity are measured. Samples of the formation sands may be taken for the purpose of measuring, inter alia, the water saturation.

From the pump capacity and the depth as well as the injectivity or permeability of the formation, the minimum required initial resin separation time, which at least equals the time required to pump the resin solution down to the formation, can be calculated.

From laboratory test results such as those in Tables 2 and 3, the required percentages of the epoxy compound, curing agent, ketone, cure rate acelerator, if used, and solvent are determined, which give an initial resin separation time which at the temperature of the earth formation is sufficient to permit pumping the solution down into the formation without encountering premature separation of resin from the solution.

The required proportions of epoxy compound, ketone solution of curing agent, and, if present, promotor for accelerating the rate of reaction between curing agent and epoxy compound to the desired degree, are subsequently dissolved in the solvent. The promoter should be mixed with the epoxy compound/curing agent solution only just before the solution is pumped into the borehole.

Referring now to the drawing, FIG. 1 shows a well borehole which has been drilled through various strata, including a formation or formations having an oil producing zone 12. Well casing 13 is shown traversing oil zone 12. Dependent in the casing is a tubing string 14 which is perforated at the lower end thereof with perforations 23 and which carries straddle packers 21 and 22, capable of isolating a section of the borehole within the oil bearing formation 12. Within said isolated section, the casing is perforated with perforations 24, so that the tubing is in liquid communication with the oil-bearing formation.

After the required preparations have been made as described, an oil-displacing fluid, e.g., diesel oil or a diesel oil-aromatics mixture, may be pumped down through tubing 14 and into the oil-bearing formation. Following this there may be pumped down a water-displacing fluid, e.g., isopropyl alcohol, and then a spacer fluid, e.g., the same hydrocarbon composition used as solvent for the resin. Finally there is pumped into the formation the freshly prepared resin solution of predominantly aromatic hydrocarbons and ketone containing dissolved therein a polyepoxide, the amine curing agent, and a cure rate accelerator, all as described above. The resin solution is followed by a drive fluid.

The oil-displacing fluid is used where the oil in the formation is relatively viscous. This fluid dilutes the oil and facilitates its displacement from the pore space to be treated. The water-removing fluid dissolves or emulsifies the connate water adhering to the grains of the formation. Thereafter, the spacer-fluid drives out the solution or emulsion of water in the water-removing fluid; the spacer-fluid is followed by the resin solution.

FIG. 1 illustrates the situation after all described liquids have been pumped down through tubing 14 and into oil zone 12 and drive fluid 25, e.g., mud slush, has just reached the walls of the casing. As shown in FIG. 1, the portion of the oil zone nearest the well borehole has the pores between sand grains of the formation filled with resin solution 16. Immediately outside the zone containing the resin solution there is a zone into which spacer liquid 18 has been displaced. Still further out are the zones containing water-displacing liquid 19 and oil-displacing liquid 20. At this stage further pumping into the formation is discontinued and the well is shut in for a period such as, for example, 24 to 36 hours, to permit the resin to precipitate from the solution and harden on the sand grains of the formation. Thereafter the well is opened, permitting the remaining solvent, spacer liquid, water-displacing liquid and oil-displacing liquid to be withdrawn back into the borehole and up through the tubing, either by virtue of the natural pressure of fluids in the formation or by pumping as required.

Figure 2:
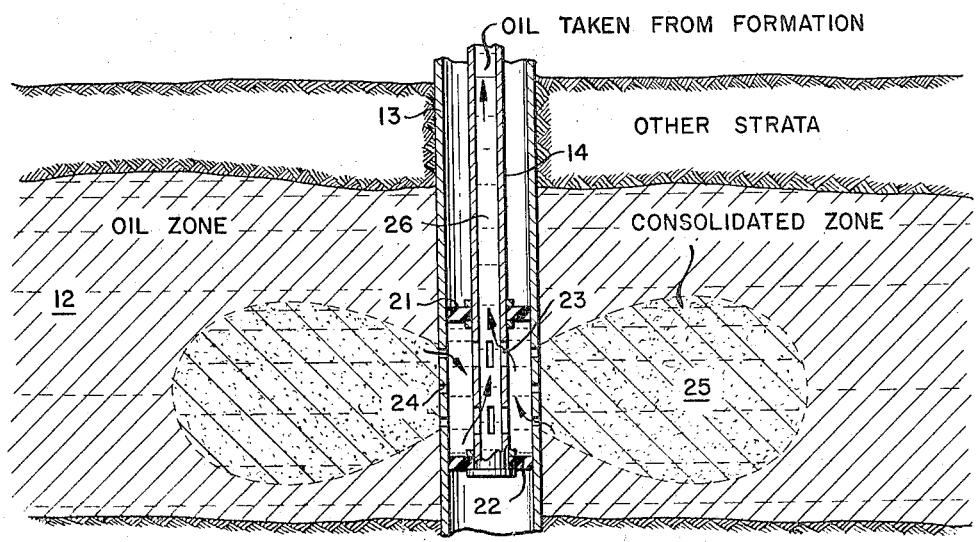
FIG. 2 is a vertical section through the same well borehole shown in FIG. 1, illustrating the production of oil from the treated formation.

FIG. 2 illustrates the same well as FIG. 1, after the well has been placed in operation. The several fluids, including the remaining liquid components of the resin solution, has been withdrawn back up through tubing 14 and oil 26 is now being produced from formation 12 and removed through the tubing. Zone 25 shows the area which had contained the resin solution. In this area the sand grains which were previously unconsolidated are now firmly bound together by cured resin. The strength of this zone continues to increase for several days after completion of the treatment, and ultimately reaches a plateau of strength which appears to be permanent.

Figure 3:
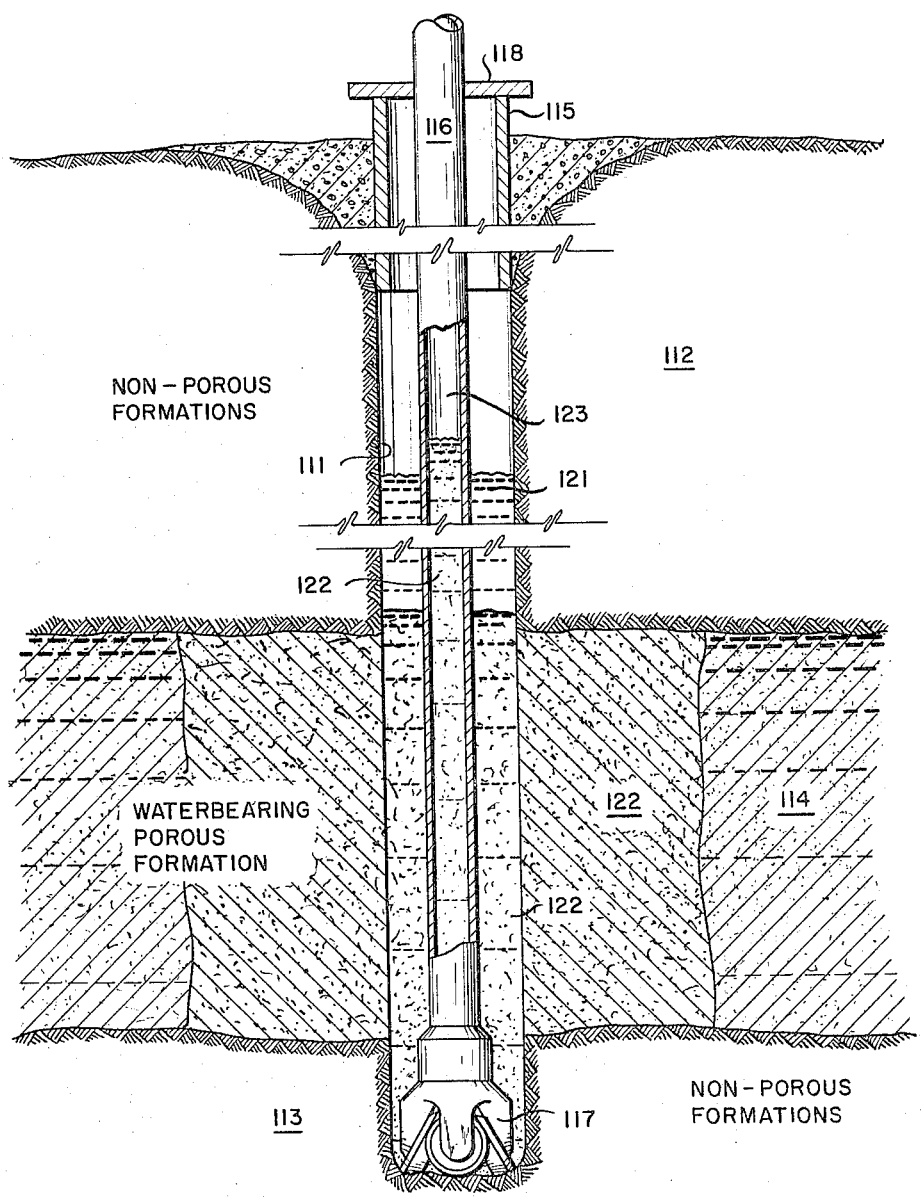
FIG. 3 is a vertical section through a well borehole, illustrating injection of resin solution into a formation for purpose of plugging.

The method of plugging a formation according to this invention is illustrated by reference to FIG. 3 of the drawing.

In the drawing a well borehole 111 is shown which has been drilled through various strata, including nonporous formations 112 and 113 and a porous water-bearing formation 114. A well casing 115 is shown cemented in the upper portion of the well ending in nonporous formation 112. A drill string 116 is placed in the well, terminating in drill bit 117. The well is capped as indicated schematically by cap 118.

After the required preparations have been made as described, water is introduced into the well through tubing 116 until pumping pressures indicate that the water column in the borehole is remaining substantially static and water is entering the formation 114. The prepared resin-forming solution, having a composition calculated to set up as a gel rather than depositing liquid resin on the sand particles is then pumped into the well and enters the formation. The drawing illustrates that stage of the operation at which a head of water, 121, is in the borehole while part of resin-forming solution 122 has entered the formation and some is still in the borehole and in the drill string. A displacing fluid, 123, such as crude oil or mud slush, or a gel plug followed by a displacing fluid, is in the drill string above the resin-forming solution.

After the desired amount of resin-forming solution has been introduced into the formation, the drill string is raised above the level of resin soltuion in the well and the well is kept shut in until the resin solution has set up as a solid gel and cured to sufficient hardness to withstand the formation pressure. The remaining resin plug in the borehole can then be drilled out, and further drilling of the well resumed.

It will be readily apparent that numerous other methods for introducing the required solutions into earth formations can be applied. For example, it is sometimes desirable to place a casing string in the borehole, seal the casing string in the borehole along the length of the string passing through the formation to be treated, form a channel through the string and into the permeable section of the formation and then inject the treating solution in the manner previously described through the channel so formed into the permeable formation. Details concerning such a method of injecting treating solutions in general into a formation are given, for example, in copending patent application Ser. No. 169,016 to Prats et al., filed January 26, 1962.

When only a small portion of formation is to be treated, a special tool may be employed in which each solution, i.e., water displacing fluid and treating solution, is contained in a separate compartment. The tool is lowered on a wireline to the desired depth, the casing and formation are penetrated if necessary, the solutions are forced from the tool into the formation in the desired sequence, and the well is shut in for the time required for the resin to precipitate and harden. This system permits use of the solution employing the curing agent of this invention in formations characterized by extremely high temperatures, at which the IRS is short.

Still other methods of injecting the desired treating solutions into the formation to be treated will occur to the person skilled in the art.

The following illustrates the application of the method of this invention to consolidation of sand surrounding an oil well, while retaining permeability. The oil producing formation is a clean, well developed, sand stringer in the Miocene N series. An analysis of side wall samples, which are loosely consolidated very fine to fine grain sand, indicates that the sand contains approximately 10% clay, such as kaolinite and montmorillonite. The interval to be consolidate in the well is a 9 foot stringer of which 6 feet is perforated. The bottom hole temperature is 100° C.

Prior to preparing the resin solution, the initial resin separation times for solutions of 13.5% of polyepoxide and 4.5% of bis(4-aminophenyl)methane in aromatic hydrocarbon solvent with varying amounts of phenol are determined at 100° C. In this instance, the information is presented in Table 3, above. The well crude oil being not completely soluble in diesel oil, a 50-50 blend of diesel oil and aromatic kerosene extract is used as a first wash in the well treatment. This blend dissolves all the components of the crude.

The treatment is designed to consolidate a cylinder 3 feet in radius and 9 feet in depth, the entire thickness of the sand stringer. The sand is first washed with 3 pore volumes of the blend of diesel oil and kerosene extract. This is followed by an equal volume of ispropyl alcohol to remove any remaining water from the formation. Half a volume of diesel oil-kerosene extract is then pumped down as spacer. The resin solution is mixed to have an initial resin separation time sufficient to permit it to be pumped into the formation. About 1.1 pore volume of the resin solution is placed into the formation. Care is taken that the resin solution is just displaced into the formation without penetrating too far and without retaining any resin solution in the well bore itself. The well is then shut in for 24 hours.

When pressure is released on the well, the fluids begin to unload immediately. Thus swabbing is not required to bring the well into production. On a 1 hour production test only 0.2% B.S. shakeout is obtained. Although similar sand has been effectively retained by other methods not involving epoxy resin solutions, those wells have produced large amounts of sand during cleanup until bridging occurs. This well produces sand free immediately. Sand free production is thereafter obtained.

We claim as our invention:

1. In the method of treating a permeable earth formation which comprises
    (a) preparing a solution comprising a solvent, a resin-forming polyepoxide and a curing agent for said polyepoxide;
    (b) injecting said solution into said formation; and
    (c) retaining said solution in said formation for a sufficient time to permit the resulting epoxy resin to adhere to the sand grains of said formation and cure to a hard, cross-linked, hydrocarbon-insoluble resin;
the improvement which comprises preparing as said solution a mixture of:
    (1) a hydrocarbon solvent containing at least 80 percent by weight of aromatic hydrocarbon;
    (2) a resin-forming polyepoxide;
    (3) bis(4-aminophenyl)methane; and
    (4) a lower aliphatic ketone;
in proportions selected such that:
    (i) the total amount of said hydrocarbon solvent is between 30 and 95 percent by volume of said solution;
    (ii) the total amount of polyepoxide and bis(4-aminophenyl)methane is between 3 and 50 percent by volume of said solution
    (iii) the total amount of said ketone is between 2 and 20 percent by volume of said solution and is sufficient to keep bis(4-aminophenyl)methane in solution; and
    (iv) the composition of said solution is predetermined to maintain the partial reaction product of said polyepoxide and bis(4-aminophenyl)methane dissolved for the time required to inject said solution into said formation.

2. The method of consolidating an at least substanially unconsolidated earth formation according to claim 1, wherein the total concentration of polyepoxide and bis(4-aminophenyl)methane is in the range from 5 to 20 percent by volume of said solution and the composition of said solution is predetermined to cause the partial reaction product of said polyepoxide and bis(4-aminophenyl)methane to precipitate from solution as a liquid, adhere to the sand grains of said formation and cure, in such manner that a substantial proportion of the permeability of said formation is retained.

3. The method of plugging a permeable earth formation according to claim 1, wherein the total concentration of polyepoxide and bis(4-aminophenyl)methane is in the range from 20 to 50 percent by volume of said solution and the composition of said solution is predetermined to cause the solution which contains the partial reaction product of said polyepoxide and bis(4-aminophenyl)methane to set up as a gel within the pores of said formation in such a manner that the pores-space of said formation is filled and no permeability is retained.

4. The method according to claim 2 wherein said solution comprises:

(1) hydrocarbon solvent which contains at least 80 percent by weight aromatics and boils in the range from 350° to 650° F.;
(2) normally liquid polyepoxide which is the product of the reaction of 2,2-bis(4-hydroxyphenyl)propane and epichlorohydrin in an alkaline medium,
(3) bis(4-aminophenyl)methane;
(4) acetone; and
(5) from 0.25 to 4 percent by volume of phenol;
and wherein the weight ratio of said bis(4-aminophenyl)methane to said polyepoxide is about 0.33.

5. The method according to claim 4 wherein said earth formation, prior to treatment, contains connate water, and wherein said water is displaced from said formation by forcing a water-displacing liquid into said formation prior to said resin-forming solution.

6. The method according to claim 4 wherein said earth formation contains connate water and is penerated by a borehole, and wherein there are forced into a portion of said formation surrounding said borehole, through suitable perforations, in seqence:
    (1) a crude-oil-displacing fluid;
    (2) a water displacing fluid;
    (3) a spacer fluid; and
    (4) said resin-forming solution;
and said formation is then shut in for the time required by the reaction product of the polyepoxide and bis(4-aminophenyl)methane to cure to a hard, cross-linked, hydrocarbon-insoluble resin.

7. The method of consolidating an interval of a permeable, at least substantially unconsolidated earth formation which is at a temperature in the range from 80° to 120° C., contains connate water, and is in fluid communication with a borehole, which comprises:
    (a) preparing a solution of resin-forming polyepoxide and amine which maintains a viscosity below 100 centipoises at least until it enters said formation, said solution comprising
        (1) about 70 to about 71.75 percent by volume of a hydrocarbon solvent which boils in the range from 350° to 650° F. and which contains at least 80 percent by weight aromatic hydrocarbons, the remainder being saturated hydrocarbons;
        (2) about 13.5 percent by volume of a normally liquid polyepoxide which is the product of the reaction of 2,2-bis(4-hydroxyphenyl)propane and epichlorohydrin in an alkaline medium, and which has a molecular weight in the range from about 350 to 400 and an epoxy equivalent in the range from about 1.75 to 2.1;
        (3) about 4.5 percent by volume of bis(4-aminophenyl)methane;
        (4) about 10 percent by volume of acetone; and
        (5) about 0.25 to 2 percent by volume of phenol;
        in proportions selected such that the partial reaction product of said polyepoxide and said amine remains dissolved for the time required to inject said solution into said formation;
    (b) isolating a zone of said borehole adjacent the formation interval to be treated,
    (c) pumping into said formation interval through said isolated zone of said borehole a crude-oil-displacing fluid,
    (d) thereafter pumping into said formation interval through said isolated zone of said borehole isopropanol as water-displacing fluid,
    (e) thereafter pumping said resin solution into said formation interval through said isolated zone of said borehole,
    (f) retaining said solution in said formation for a sufficient time to permit partially cured epoxy resin to separate from said solution, deposit on the sand grains of said formation as a thin surface layer and cure to a hard, cross-linked, hydrocarbon insoluble resin, and (g) producing oil from said oil-bearing formation through said consolidated formation interval and said borehole.

References Cited by the Examiner
UNITED STATES PATENTS 3,100,527  8/1963  Hilton et al. _____ 166—33
3,123,138  3/1964  Robichaux _____ 166—33

CHARLES E. O'CONNELL, *Primary Examiner.*

J. A. LEPPINK, *Assistant Examiner.*